(12) United States Patent
Bastide et al.

(10) Patent No.: US 10,394,840 B2
(45) Date of Patent: Aug. 27, 2019

(54) SOCIAL NETWORK CONTENT ANALYSIS (71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 15/188,167

(22) Filed: Jun. 21, 2016

(65) Prior Publication Data
US 2017/0364567 A1 Dec. 21, 2017

(51) Int. Cl.
*G06F 16/24* (2019.01)
*G06F 16/248* (2019.01)
*H04L 12/58* (2006.01)
*G06F 16/9535* (2019.01)
*G06F 16/2457* (2019.01)

(52) U.S. Cl.
CPC ...... *G06F 16/248* (2019.01); *G06F 16/24575* (2019.01); *G06F 16/9535* (2019.01); *H04L 51/32* (2013.01)

(58) Field of Classification Search
CPC ......... G06F 17/30554; G06F 17/30528; G06F 17/30867
See application file for complete search history.

(56) References Cited

U.S. PATENT DOCUMENTS

| | | | |
|---|---|---|---|
| 6,925,605 B2 | 8/2005 | Bates et al. | |
| 7,136,710 B1 | 11/2006 | Hoffberg et al. | |
| 7,844,666 B2 | 11/2010 | Horvitz et al. | |
| 7,904,399 B2 | 3/2011 | Subramaniam et al. | |
| 7,933,961 B2 | 4/2011 | Mandel et al. | |
| 8,171,128 B2 * | 5/2012 | Zuckerberg | G06Q 30/02 707/702 |
| 8,943,134 B2 | 1/2015 | Reis et al. | |
| 8,949,357 B2 | 2/2015 | Bradshaw | |
| 9,177,065 B1 | 11/2015 | Ben-Yair et al. | |

(Continued)

OTHER PUBLICATIONS

Disclosed Anonymously et al., "System for Managing authored content over time taking into account specified individuals",An IP.com Prior Art Database Technical Disclosure, IP.com No. IPCOM000229387D, Ip.com Electronic Publication Date: Jul. 26, 2013, 4 pages.

(Continued)

*Primary Examiner* — Loc Tran
(74) *Attorney, Agent, or Firm* — Gilbert Harmon, Jr.

(57) ABSTRACT

A method includes receiving one or more updates in a social networking system corresponding to one or more topics, determining one or more constraints corresponding to the received one or more updates, updating a threshold value associated with each of the one or more determined user constraints, calculating a constraint score corresponding to each constraint of the one or more constraints, determining whether each constraint score meets a selected threshold value, and presenting the update responsive to determining that each constraint score meets a selected threshold value. A computer program product and computer system corresponding to the method are also disclosed.

17 Claims, 5 Drawing Sheets

(56) References Cited

U.S. PATENT DOCUMENTS

| | | | |
|---|---|---|---|
| 9,223,835 | B1 | 12/2015 | Mazniker et al. |
| 2003/0139902 | A1 | 7/2003 | Geib et al. |
| 2010/0121849 | A1 | 5/2010 | Goeldi |
| 2012/0290583 | A1* | 11/2012 | Mahaniok ................. G06F 8/60 707/741 |
| 2013/0018955 | A1 | 1/2013 | Thaxton et al. |
| 2014/0006400 | A1 | 1/2014 | Bastide et al. |
| 2014/0052540 | A1 | 2/2014 | Rajaram et al. |
| 2014/0280524 | A1* | 9/2014 | Paradise ................. H04L 67/22 709/204 |
| 2014/0280890 | A1 | 9/2014 | Yi et al. |
| 2015/0120717 | A1 | 4/2015 | Kim et al. |
| 2015/0269155 | A1 | 9/2015 | Bastide et al. |
| 2015/0347596 | A1 | 12/2015 | Mandel et al. |
| 2015/0381555 | A1 | 12/2015 | Faller et al. |
| 2016/0219119 | A1* | 7/2016 | Yu ........................... H04L 67/22 |
| 2017/0337263 | A1* | 11/2017 | Muralidharan ..... G06F 16/3344 |

OTHER PUBLICATIONS

IBM Knowledge Center, "What do I need to know about using IBM Verse for Apple devices?", printed on Apr. 14, 2016, 1 page, <https://www.ibm.com/support/knowledgecenter/SSYRPW_9.0.1/iOSVerseNeedtoKNow.dita>.

Reed, Frank, "Facbook Looks to Improve News Feed Content Quality", Marketing Pilgrim, © 2005-2015 Marketing Pilgrim, posted, Aug. 26, 2013, 4 pages, <http://www.marketingpilgrim.com/2013/08/facebook-looks-to-improve-news-feed-content-quality.html>.

"Deep learning", From Wikipedia, the free encyclopedia, This page was last modified on Apr. 10, 2016, 18 pages, <https://en.wikipedia.org/wiki/Deep_learning>.

"Facebook Launches Advanced AI Effort to Find Meaning in Your Posts", posted by Timothy on Saturday Sep. 21, 2013, Copyright © 2016 SlashdotMedia, 11 pages, <https://tech.slashdot.org/story/13/09/21/1831239/facebook-launches-advanced-ai-effort-to-find-meaning-in-your-posts>.

"Release Blueprints", printed on Apr. 14, 2016, 1 page, <https://releaseblueprints.ibm.com/login.action?os_destination=/display/SFSB/Mail+Next>.

"SaneBox for Business", © Copyright 2016 SaneBox, Inc., 4 pages, <https://www.sanebox.com/business>.

"SocialMediaToday", © 2016 socialmediatoday.com, 4 pages, <https://www.sanebox.com/business>.

\* cited by examiner

| Update | User Score | Topic Score | Time Score | Rep. Score |
|---|---|---|---|---|
| 1 | 4/10 = 0.4 | 7/20 = 0.35 | 4/5 = 0.8 | 6/50 = 0.12 |
| 2 | 2/8 = 0.25 | 9/20 = 0.45 | 6/5 = 1.2 | 24/50 = 0.48 |
| 3 | 11/20 = .55 | 13/20 = 0.65 | 5/5 = 1.0 | 14/50 = 0.28 |

360

| Constraint | Value | $\geq$ or < ? |
|---|---|---|
| User Score | 0.35 | $\geq$ |
| Topic Score | 0.4 | $\geq$ |
| Time Score | 1.0 | $\leq$ |
| Rep. Score | 0.3 | $\leq$ |
| Failures | 1 | $\leq$ |

SOCIAL NETWORK CONTENT ANALYSIS

BACKGROUND OF THE INVENTION

The present invention relates generally to the field of social networking, and more specifically to prioritizing social network content according to the content's value.

Social networking services are platforms that enable the creation of social networks or social relations among people who share similar interests, activities, backgrounds, or real-life connections. Social networking services depend largely on user-generated content (UGC). Many social networking services provide an activity stream, an interface through which a user may view and interact with updates and content provided by other users.

SUMMARY

As disclosed herein, a method includes receiving one or more updates in a social networking system corresponding to one or more topics, determining one or more constraints corresponding to the received one or more updates, updating a threshold value associated with each of the one or more determined user constraints, calculating a constraint score corresponding to each constraint of the one or more constraints, determining whether each constraint score meets a selected threshold value, and presenting the update responsive to determining that each constraint score meets a selected threshold value. A computer program product and computer system corresponding to the method are also disclosed.

DETAILED DESCRIPTION

Oftentimes, when viewing particular social networks, there is a fair amount of "cost" spent on reviewing the content, such as time spent by the user. These costs can be especially great when a user has a lot of social network content to sift through, either due to the user's inactivity for an extended period or due to a large number of minor additions of content. There exists a need to filter social networking content according to a user's interest level and a user's willingness to expend effort to interact with social media content. The embodiments disclosed herein enable social networking content to be analyzed according to a number of user constraints and filtered or displayed accordingly.

Figure 1:
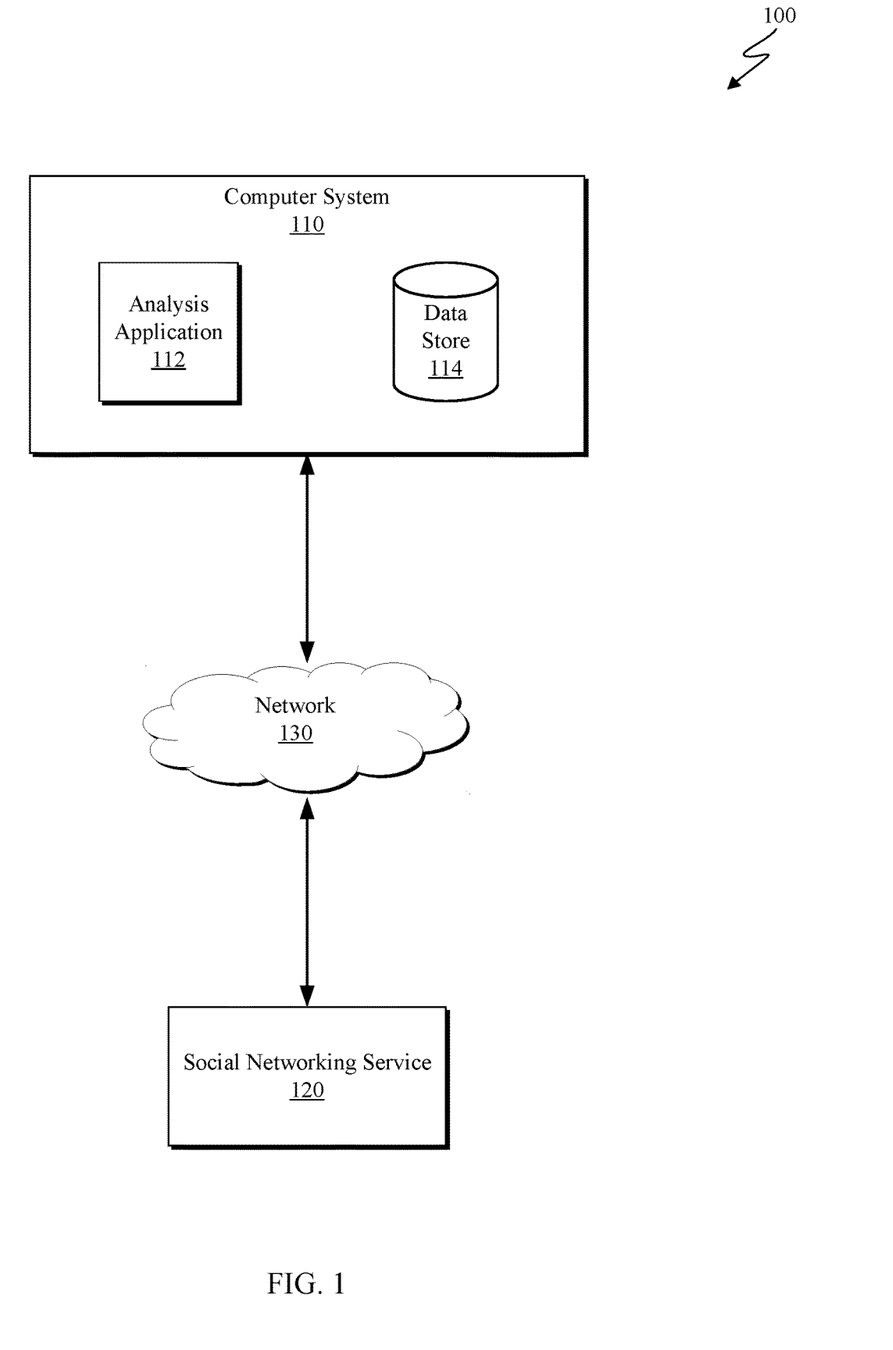
FIG. 1 is a block diagram depicting one embodiment of a social networking system in accordance with some embodiments of the present invention.

FIG. 1 is a block diagram depicting one embodiment of a social network analysis system 100 in accordance with some embodiments of the present invention. As depicted, social network analysis system 100 includes computer system 110, social network service 120, and network 130. Social network analysis system 100 may enable content analysis with respect to a user's social networking feed.

Computer system 110 can be a desktop computer, a laptop computer, a specialized computer server, or any other computer system known in the art. In some embodiments, computer system 110 represents a computer system utilizing clustered computers and components to act as a single pool of seamless resources. In general, computer system 110 is representative of any electronic device, or combination of electronic devices, capable of executing machine-readable program instructions, as described in greater detail with regard to FIG. 4.

As depicted, computer system 110 includes analysis application 112 and data store 116. Analysis application 112 may be configured to receive social networking updates from social network service 120 via network 130. In one or more embodiments, analysis application 112 is configured to execute a content analysis method on the received social networking updates. One example of an appropriate content analysis method is described with respect to FIG. 2.

Data store 116 may be configured to store social networking update content. In some embodiments, data store 116 is configured to store scoring and prioritization information with respect to a plurality of social networking updates. Data store 116 may be any non-volatile storage media known in the art. For example, data store 116 can be implemented with a tape library, optical library, one or more independent hard disk drives, or multiple hard disk drives in a redundant array of independent disks (RAID). Similarly, data on data store 116 may conform to any suitable storage architecture known in the art, such as a file, a relational database, an element-oriented database, and/or one or more tables.

Social network service 120 may be any platform through which social networks or social relations are made. In some embodiments, social network service 120 is a web-based service which provides means for users to interact over the internet, utilizing features such as emailing and instant messaging. Social network service 120 may provide social networking updates to computer system 110 via network 130.

Figure 2:
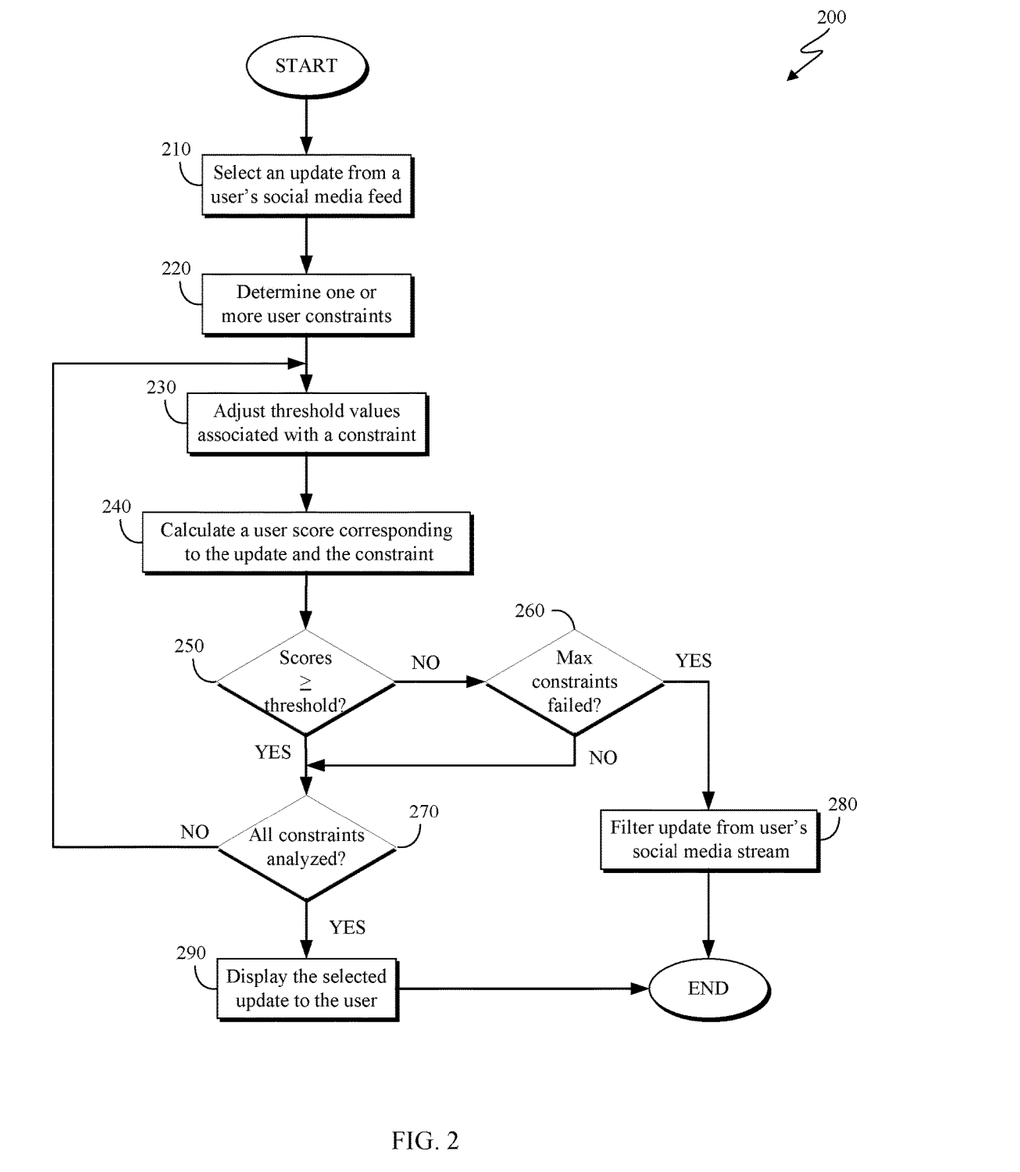
FIG. 2 is a flowchart depicting one embodiment of a content analysis method in accordance with at least one embodiment of the present invention.

FIG. 2 is a flowchart depicting one embodiment of a content analysis method 200 in accordance with at least one embodiment of the present invention. As depicted, content analysis method 200 includes selecting (210) an update from a user's social networking feed, determining (220) one or more user constraints associated with the update, adjusting (230) threshold values associated with a constraint, calculating (240) a constraint score corresponding to the update and the selected constraint, determining (250) if the constraint score exceeds the constraint threshold, determining (260) if a maximum number of constraints have failed, determining (270) if all constraints have been analyzed, filtering (280) the update from the user's activity stream, and displaying (290) the selected update to the user. Content analysis method 200 may enable social networking updates to be filtered such that only updates that are of interest to a user will be displayed.

Selecting (210) an update from a user's social networking feed may include receiving a set of one or more social networking updates from a social networking server. In some embodiments, selecting (210) an update from a user's social networking feed includes identifying a most recent update to be analyzed. Selecting (210) an update from a user's social networking feed may further include identifying one or more update characteristics. The update characteristics may include who created the update, what the topic of the update is, as well as any additional sources cited within the update (in the case of link sharing, etc.).

Determining (220) one or more user constraints associated with the update may include receiving a set of constraints to be determined for an update. The set of constraints may correspond to characteristics of the update which may influence a user's willingness and ability to read or interact with the update. For example, the set of constraints may include an amount of time required to read the update, an author score indicating the user's average interest level in content shared by the author of the update, a topic score indicating the user's average interest level in content corresponding to the same topic as the update, or a repetition score indicating how similar to other updates in the user's feed the selected update is. In some embodiments, determining (220) one or more user constraints associated with the update includes monitoring the user's interactions in a social networking system to form an activity history of interactions by topic. The activity history of interactions by topic may include an indication of the user's interest level in each topic, as well as how much time the user has spent interacting with updates corresponding to each topic.

Adjusting (230) threshold values associated with a constraint may include assigning a default value to a threshold that each constraint score must exceed for the update to be displayed to the user. In some embodiments, an additional threshold value may be added to indicate how many of the constraints an update must meet. For example, if four constraints are applied in a scenario, four constraints may be applied indicating that the first constraint score must exceed 0.75, the second constraint score must exceed 0.7, the third constraint score must exceed 0.5, and the fourth constraint score must exceed 0.3. In this embodiment, an additional threshold value may be applied indicating that 3 or more of the constraint conditions must be met for the selected update to be displayed to the user.

Calculating (240) a constraint score corresponding to the update and the selected constraint may include calculating a score corresponding to the update for a single constraint. An author score may be calculated as a percentage of the updates from the author the user has historically viewed or interacted with. A topic score may be calculated as a percentage of the updates corresponding to a similar topic the user has historically viewed or interacted with. In some embodiments, a repetition score is calculated as a percentage of the X most recent updates that correspond to the same topic as the selected update, where X is an integer that can be configurable by the user.

Determining (250) if the constraint score exceeds the constraint threshold value may include providing the calculated constraint score and the provided constraint threshold value to a comparator module. The comparator module may be configured to determine which of the two values is greater. If the constraint score exceeds the constraint threshold value (250, yes branch), the method continues by determining (270) if all constraints have been analyzed for the selected update. If the constraint score does not exceed the constraint threshold value (250, no branch), the method continues by determining (260) if a maximum number of constraints have failed to meet the threshold values.

Determining (260) if a maximum number of constraints have failed to meet the threshold values may include creating a record of the number of constraints for which the constraint score associated with the selected update did not exceed the constraint threshold. The record may be a counter that is increased by one each time a constraint score is less than the constraint threshold. If a maximum number of constraints have failed to meet the threshold values (260, yes branch), the method continues by filtering (280) the selected update from the user's activity stream. If a maximum number of constraints have not failed to meet the constraint threshold values (260, no branch), the method continues by determining (270) if all constraints have been analyzed.

Determining (270) if all constraints have been analyzed for the selected update may include verifying that comparison results corresponding to each previously identified constraint exist. If all of the constraints have been analyzed (270, yes branch), the method continues by displaying (290) the selected update to the user. If all of the constraints have not been analyzed (270, no branch), the method continues by returning to adjusting (230) threshold values associated with a constraint.

Filtering (280) the selected update from the user's activity stream may include removing the selected update from a set of updates to be displayed to the user. In one or more embodiments, filtering (280) the selected update includes adding the selected update to a set of updates that will be searchable by and available to the user, but will not be presented to the user in a activity stream.

Displaying (290) the selected update to the user may include adding the selected update to a set of updates to be displayed to the user via a social networking server. In one or more embodiments, the set of updates is then displayed to a user via the user's activity stream. The selected update may be displayed to the user via a display such as is discussed with respect to FIG. 4.

Figure 3A:
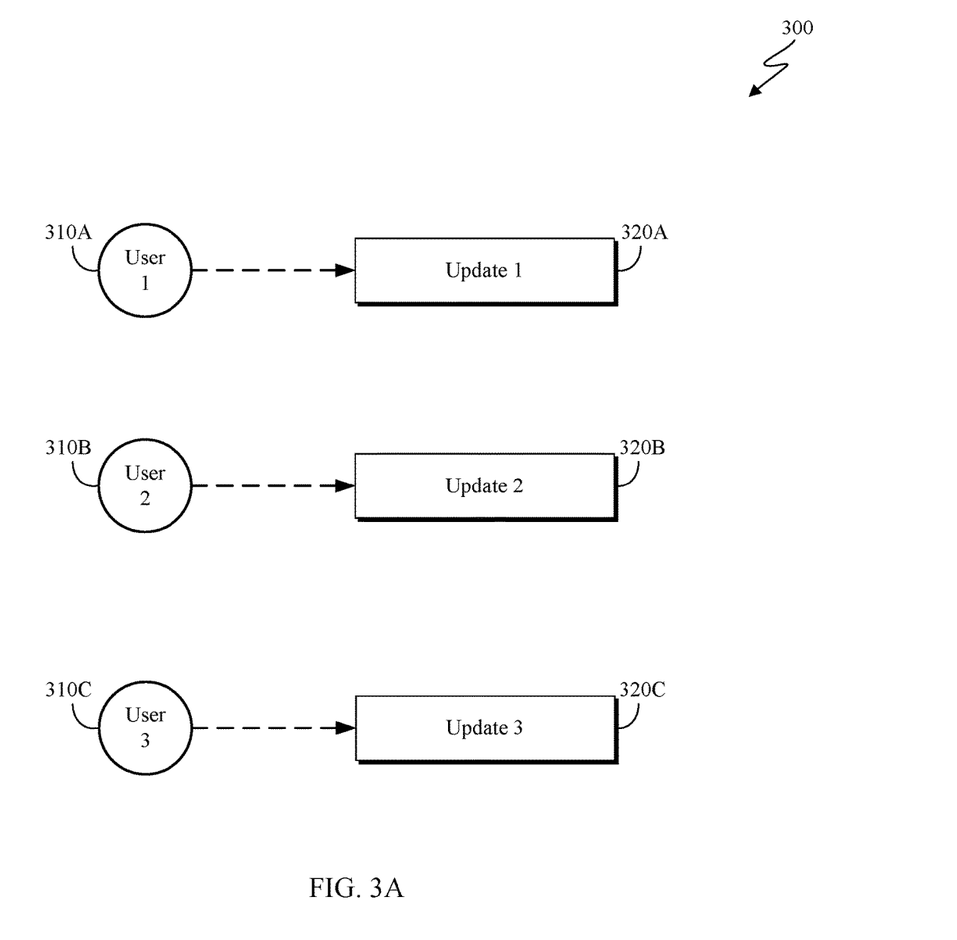
FIG. 3A depicts example social networking updates in accordance with at least one embodiment of the present invention.

FIG. 3A depicts example social network content 300 in accordance with one embodiment of the present invention. As depicted, the social network content 300 includes three users 310 providing 3 updates 320. Update 320A corresponds to content provided by user 310A, update 320B corresponds to content provided by user 320B, and update 320C corresponds to content provided by user 320C. Social network content 300 depicts example social networking content which may be analyzed using a content analysis method.

Figure 3B:
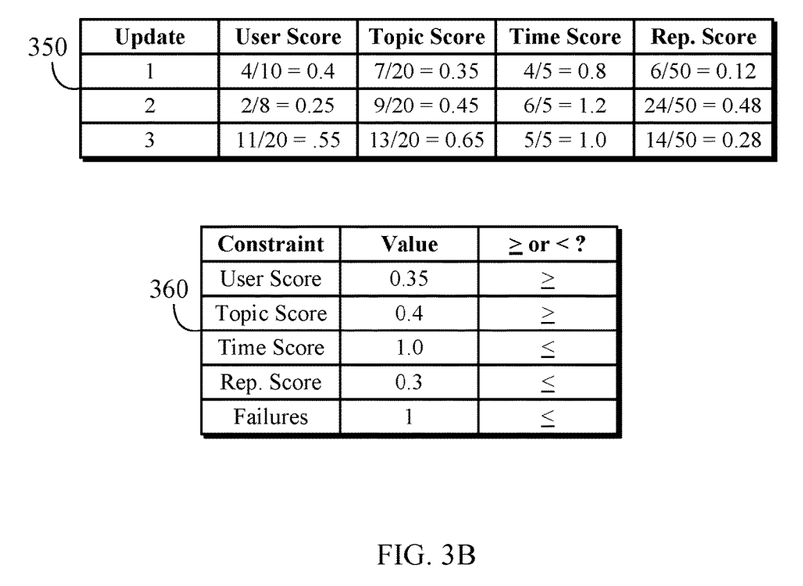
FIG. 3B depicts update scores associated with the example media updates in accordance with at least one embodiment of the present invention.

FIG. 3B depicts an update score table 350 and a threshold table 360 associated with the example media updates in accordance with one embodiment of the present invention. As depicted, the update score table includes, for each update 320, an author score, a topic score, a time score, and a repetition score. Each score is calculated as a ratio of a number of updates that meet a certain criteria to a total number of updates to which the criteria can apply. For example, the author score is calculated as a ratio of the number of updates from the update's author the user has interacted with to the total number of updates provided by the author. The topic score is calculated as a ratio of the number of updates with similar content the user has interacted with to the total number of updates in the user's stream with similar content. The time score is calculated as a ratio of an estimated amount of time the user would spend reading the update to an amount of time the user has indicated he/she is willing to spend reading an update. The time an update will take to read may be calculated according to a word count and a user's reading speed, wherein the reading speed may be an average reading speed or a previously measured reading speed specific to the user. The repetition score is calculated as a ratio of the number of updates with the same keywords as the selected update in the last X updates to X, where X is a pre-selected integer. In the depicted embodiment, X is 50.

As depicted, threshold table 360 includes threshold values corresponding to each of the constraint scores. Threshold table 360 includes 3 columns: one column indicating one of the constraint scores, a second column indicating the threshold value for the corresponding constraint score, and a third column indicating whether the constraint score needs to be greater than or less than the threshold value to be acceptable. As indicated, for an update to be acceptable, the user score must be greater than the threshold value of 0.35, the topic score must be greater than a threshold value of 0.40, the time score must be less than the threshold value of 1.0, and the repetition score must be less than a threshold value of 0.3. Also indicated is the number of constraints an update must fail before it is filtered from the user's activity stream. In this embodiment, if the update fails more than 1 of the 4 constraint criteria, the update is filtered.

Figure 3C:
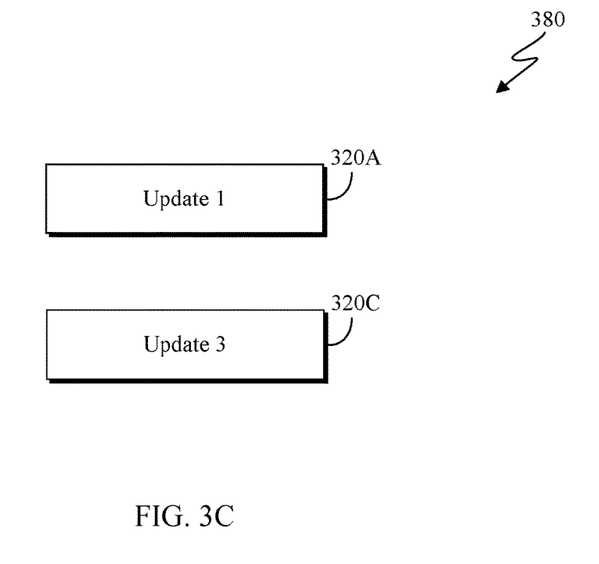
FIG. 3C depicts an example activity stream in accordance with at least one embodiment of the present invention.

FIG. 3C depicts an activity stream 380 in accordance with one embodiment of the present invention. As depicted, the activity stream 380 includes updates 320A and 320C. Update 320B is not included in the activity stream 380, as it failed to meet 2 of the 4 constraint score criteria, and was therefore filtered and not displayed to the user.

Figure 4:
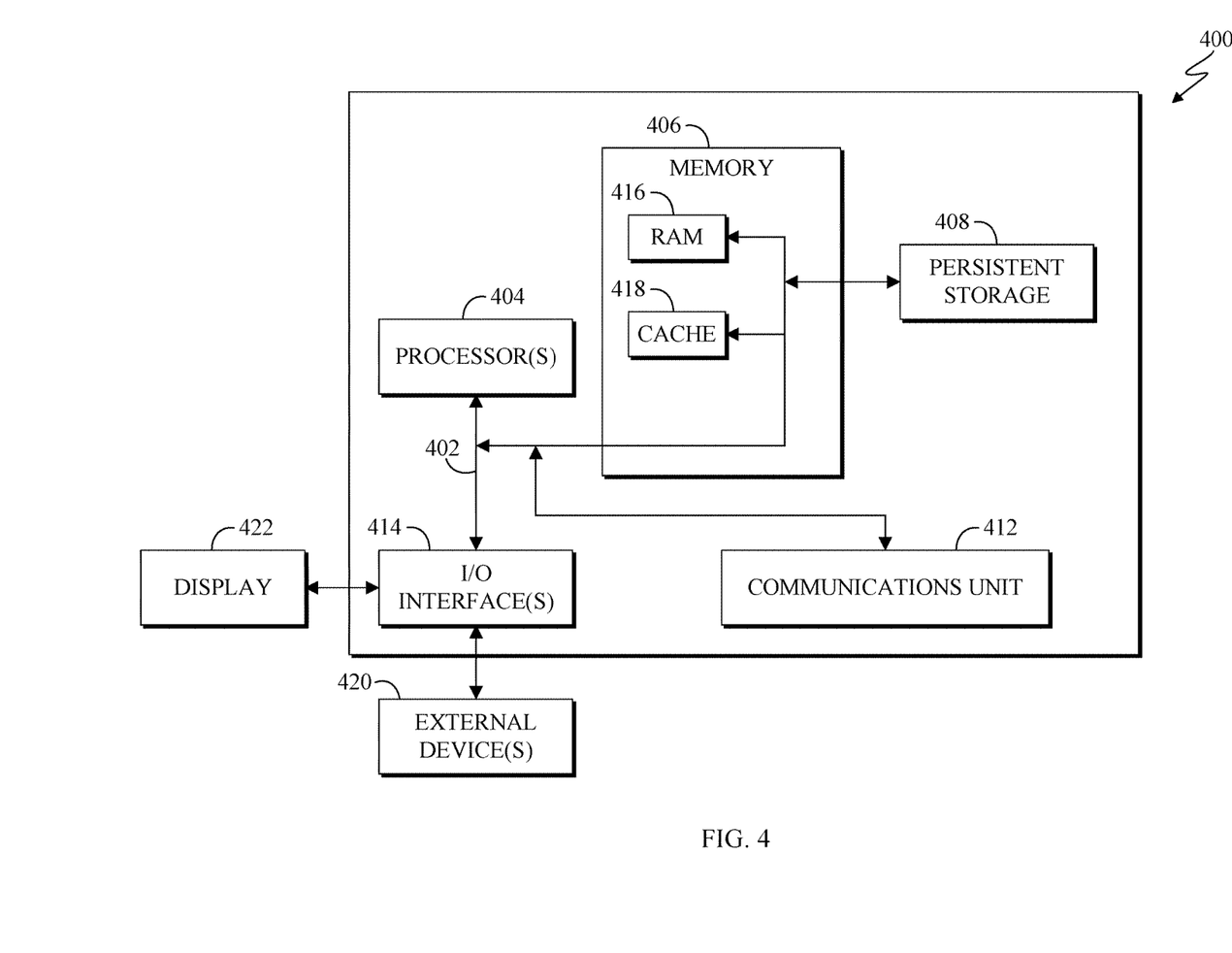
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving one or more updates in a social networking system corresponding to one or more topics;
   determining user constraints corresponding to a selected update of the received one or more updates;
   updating a threshold value associated with each of the determined user constraints;
   calculating a constraint score corresponding to each of the determined user constraints, wherein the constraint scores include:
      an author score, which is calculated as a ratio of a number of updates from the selected update's author the user has interacted with to the total number of updates provided by the author;
      a topic score, which is calculated as a ratio of a number of updates with similar content to the selected update that the user has interacted with to a total number of updates in a user's stream with similar content;
      a time score, which is calculated as a ratio of an estimated amount of time the user would spend reading the selected update to an amount of time the user is willing to spend reading an update; and
      a repetition score;
   determining whether each of the constraint scores meets the corresponding updated threshold value; and
   presenting the update responsive to determining that each of the constraint scores meets the corresponding updated threshold value.

2. The method of claim 1, further comprising filtering the update from a user's activity stream responsive to determining the calculated constraint score does not meet a selected threshold value.

3. The method of claim 1, wherein one of the user constraints corresponds to a user's interest level.

4. The method of claim 1, further comprising monitoring a user's interactions in a social networking system to form an activity history of interactions by topic.

5. The method of claim 4, wherein the activity history of interactions includes a time spent on each interaction and an interest level in each interaction.

6. The method of claim 1, wherein the one or more received updates are presented based on an ordering corresponding to the calculated constraint scores.

7. A computer program product comprising: one or more non-transitory computer readable storage media and program instructions stored on the one or more non-transitory computer readable storage media, the program instructions comprising instructions to:
receive one or more updates in a social networking system corresponding to one or more topics;
determine user constraints corresponding to a selected update of the received one or more updates;
update a threshold value associated with each of the determined user constraints;
calculate a constraint score corresponding to each of the determined user constraints, wherein the constraint scores include:
an author score, which is calculated as a ratio of a number of updates from the selected update's author the user has interacted with to the total number of updates provided by the author;
a topic score, which is calculated as a ratio of a number of updates with similar content to the selected update that the user has interacted with to a total number of updates in a user's stream with similar content;
a time score, which is calculated as a ratio of an estimated amount of time the user would spend reading the selected update to an amount of time the user is willing to spend reading an update; and
a repetition score;
determine whether each of the constraint scores meets the corresponding updated threshold value; and
present the update responsive to determining that each of the constraint scores meets the corresponding updated threshold value.

8. The computer program product of claim 7, further comprising instructions to filter the update from a user's activity stream responsive to determining the calculated constraint score does not meet a selected threshold value.

9. The computer program product of claim 7, wherein one of the user constraints corresponds to a user's interest level.

10. The computer program product of claim 7, further comprising instructions to monitor a user's interactions in a social networking system to form an activity history of interactions by topic.

11. The computer program product of claim 10, wherein the activity history of interactions includes a time spent on each interaction and an interest level in each interaction.

12. The computer program product of claim 7, wherein the one or more received updates are presented based on an ordering corresponding to the calculated constraint scores.

13. A computer system comprising: one or more computer processors; one or more computer-readable storage media; program instructions stored on the computer-readable storage media for execution by at least one of the one or more computer processors, the program instructions comprising instructions to:
receive one or more updates in a social networking system corresponding to one or more topics;
determine user constraints corresponding to a selected update of the received one or more updates;
update a threshold value associated with each of the determined user constraints;
calculate a constraint score corresponding to each of the determined user constraints, wherein the constraint scores include:
an author score, which is calculated as a ratio of a number of updates from the selected update's author the user has interacted with to the total number of updates provided by the author;
a topic score, which is calculated as a ratio of a number of updates with similar content to the selected update that the user has interacted with to a total number of updates in a user's stream with similar content;
a time score, which is calculated as a ratio of an estimated amount of time the user would spend reading the selected update to an amount of time the user is willing to spend reading an update; and
a repetition score;
determine whether each of the constraint scores meets the corresponding updated threshold value; and
present the update responsive to determining that each of the constraint scores meets the corresponding updated threshold value.

14. The computer system of claim 13, further comprising instructions to filter the update from a user's activity stream responsive to determining the calculated constraint score does not meet a selected threshold value.

15. The computer system of claim 13, wherein one of the user constraints corresponds to a user's interest level.

16. The computer system of claim 13, further comprising instructions to monitor a user's interactions in a social networking system to form an activity history of interactions by topic.

17. The computer system of claim 16, wherein the activity history of interactions includes a time spent on each interaction and an interest level in each interaction.

* * * * *